United States Patent Office

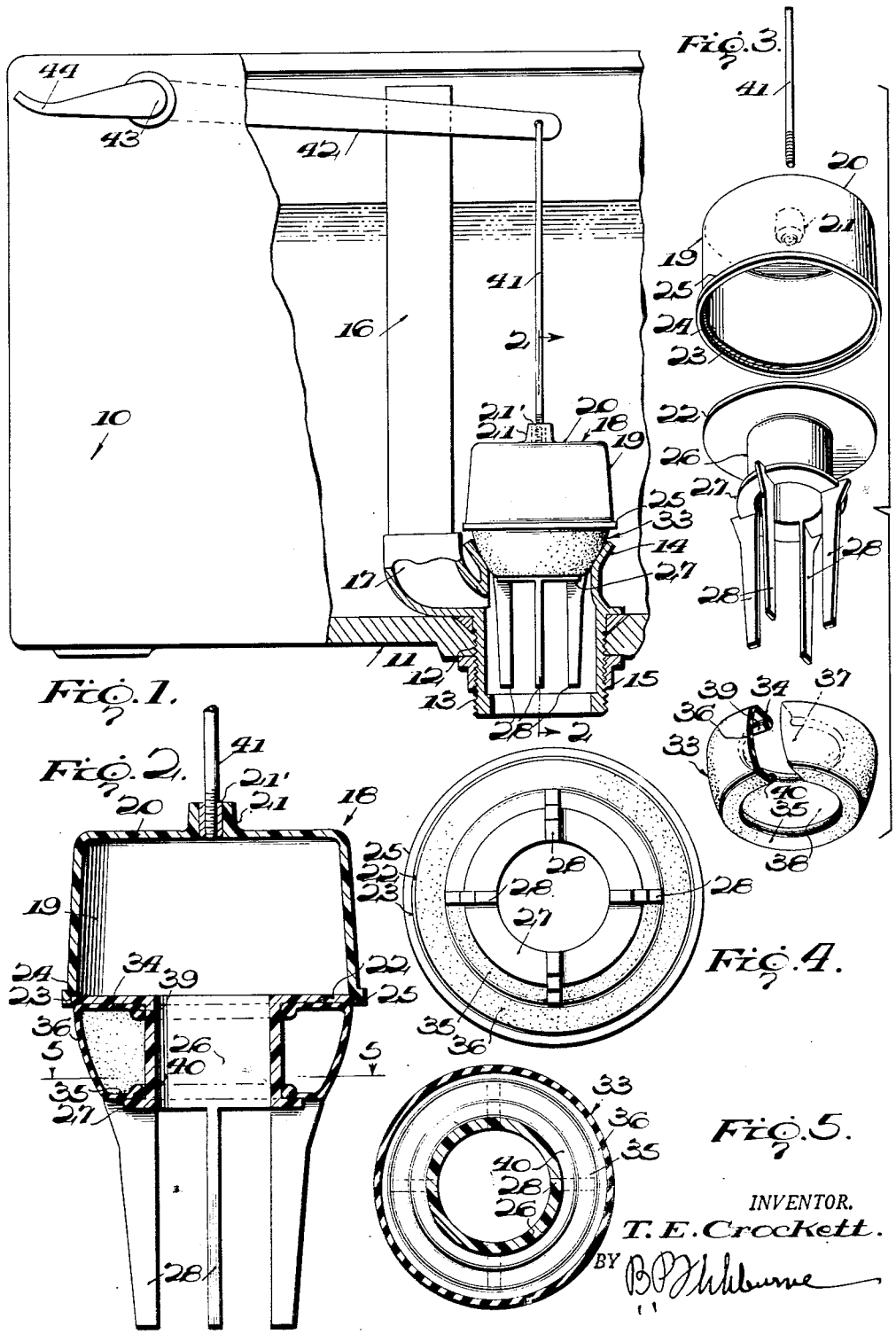

2,705,808
Patented Apr. 12, 1955

2,705,808

FLOAT VALVE FOR TOILET TANK

Thomas E. Crockett, Corpus Christi, Tex., assignor to Earnest L. Crockett, Corpus Christi, Tex.

Application July 14, 1953, Serial No. 367,796

5 Claims. (Cl. 4—57)

My invention relates to a float valve for a toilet tank.

An important object of the invention is to provide a valve device of the above mentioned character, which is self-adjusting in its seating operation to the maximum extent, and which is of simplified construction.

A further object of the invention is to provide a valve device of the above mentioned character, which will operate upon the valve seats of the ordinary toilet tanks, and which will be properly seated upon the valve seats which vary in diameter within limits.

A further object of the invention is to provide a compressible valve element which may be readily removable for replacement.

A further object of the invention is to provide a valve element which is elastic and resilient and which will securely seat itself upon the element which carries it, providing water-tight joints.

A further object of the invention is to provide a float body or casing formed in two main parts, which are assembled to provide a unit, and which may be manufactured cheaply.

A further object of the invention is to provide a valve device of the above mentioned character having guide means to cause the valve element to properly seat at all times.

Other objects and advantages of the invention will be apparent during the course of the following description.

In the accompanying drawings forming a part of this application and in which like numerals are employed to designate like parts throughout the same, Figure 1 is a side elevation of a toilet tank and associated elements, parts broken away and parts in central vertical section, showing the valve device in the seated position, Figure 2 is a vertical section taken on line 2—2 of Figure 1, Figure 3 is an exploded perspective view of the valve device, Figure 4 is a bottom plan view of the valve device, and, Figure 5 is a horizontal section taken on line 5—5 of Figure 2.

In the drawings, where for the purpose of illustration is shown a preferred embodiment of my invention, the numeral 10 designates a toilet tank, including a bottom 11, having an opening 12 formed therein, receiving a coupling 13, extending upwardly in the form of a tubular valve seat 14. The coupling 13 is held in place by a ring 15, as shown. The numeral 16 designates a vertical overflow pipe, connected at its lower end with a coupling 17, leading into the side of the tubular valve seat 14, beneath the top of the tubular valve seat, as shown.

The numeral 18 designates a float valve device. This valve device includes a hollow float body or casing 19, having a top 20, provided with an extension 21, receiving a metal sleeve 22, embedded therein and rigidly secured thereto. The lower end of the float body or casing 19 is originally formed open and this open end is closed or covered by a disc 22, fitting snugly in an annular groove 23 formed in the casing 19, at its bottom. This annular groove provides a stop shoulder 24, and the casing is preferably reinforced at its lower end by an exterior bead or flange 25. When the disc is inserted into the groove 23, it is securely attached to the casing 19 by a suitable adhesive or the like and forms a gas-tight joint with the casing 19. Formed integral with the disc 22 is a tube or sleeve 26, which is concentric with the casing 19. This sleeve or tube extends downwardly below the disc 22 for a considerable distance and the bore of the sleeve or tube is in communication with the interior of the casing 19. Formed integral with the lower end of the sleeve or tube 26 is an annular flange 27, extending radially outwardly beyond the sleeve or tube for a substantial distance, as shown. Arranged beneath the flange 27 and formed integral therewith are spaced vertical guide fingers 28, having large passages 29 between them. These guide fingers have their inner edges 30 vertical while their outer edges 31 are inclined and converge downwardly and they also have upper short inclined shoulders 32, also converging downwardly.

The casing 19 is constructed or moulded in a unit, and the disc 22, sleeve or tube 26, flange 27 and guide fingers 28 are constructed or moulded as a unit. The casing unit 19 and the unit comprising the disc 22 are preferably formed of hard rubber, plastics material, or the like, although they may be formed of metal. By forming the device in two units, it may be more cheaply moulded and the units are subsequently assembled.

The numeral 33 designates a valve element which is flexible and resilient and is formed of rubber, natural or synthetic, or any other suitable material. This valve element is also elastic. The valve element 33 is annular and includes a flat top 34 and a flat bottom 35 and a side portion 36, which is tapered downwardly. The top 34 has an opening 37 to snugly receive the sleeve or tube 26 and the bottom 27 has an opening 38 to snugly receive the sleeve or tube 26. The top 34 is provided with an internal annular bead or rib 39 and the bottom has an internal annular bead or rib 40. These beads or ribs reinforce the top and bottom adjacent to their openings, and cause the top and bottom to snugly cling to the sleeve or tube 26 and form a gas-tight joint therewith. The annular valve element 33 is hollow and is generally U-shaped in cross-section.

The annular valve element 33 is elastic and hence may be stretched over the fingers 28 and shoulders 32, to be applied to, or removed from, the sleeve or tube 26. This is an important feature as it renders replacement of the valve element possible. The valve element is slightly longer than the distance between the disc 34 and flange 27, and the valve element is therefore under slight vertical compression, when applied to the sleeve or tube 26 and the beads 39 and 40 are also under slight stretch when applied to the sleeve 26. This will cause the valve element to snugly engage the disc 34, flange 27 and sleeve 26, in use. Since the valve element is mounted upon the sleeve 26, at the top and bottom of the valve element, and since the reinforcing ribs 39 and 40 are provided, the valve element is properly supported so that it will tend to retain its shape during the maximum length of time. Further, since this valve element increases in diameter upwardly, it will be properly seated upon valve seats varying in internal diameter, within limits. This renders it possible to use the valve device with practically all makes of standard flush tanks having valve seats.

A rod or wire 41 has its lower end screw-threaded into the sleeve 22, and the upper end of the rod 29 is pivotally connected with a lever 30, rigidly mounted upon a horizontal shaft 31, pivoted upon the tank 10, and turned by a handle 32.

The guide fingers 28 extend into the coupling 13, and remain permanently therein, since they are so long that their lower ends are within the coupling when the lever 30 engages the top of the tank. These guide fingers 28 retain the valve device generally in the correct position for the proper seating of the valve element, but the tapered shoulders 32 effect the final guiding to properly seat the valve element.

The operation of the device is as follows:

When the valve device is in the seated position, the valve element 33 engages within and upon the valve seat 14, and the float body or casing 19 is submerged in the water. The water is supplied to the tank by the usual float control means. When it is desired to flush the toilet, the lever 30 is swung upwardly by depressing the lever 32, and the lever 30 elevates the body or casing 19, and shifts the valve element 36 from the valve seat. The water will now discharge through the tubular valve seat 14, by way of the passages 29, and the float body or casing 19 will float in the water and remain elevated, while the lower ends of the guide fingers 28 will remain within the coupling 13. As the water discharges from the tank, the valve device descends, and the guide fingers 28 move downwardly within the tubular valve seat 14, and the guide shoulders 32 engage the valve seat 14 and properly seat the valve.

When the water is being discharged from the tank, such discharge may be stopped at any point, by shifting the lever 32 upwardly, and this will cause the valve element 33 to instantly seat and cut off the discharge of the water.

My float device may be applied to a standard flush tank construction by removing the ordinary float ball and attaching the sleeve 22 to the usual operating wire, and the standard guide may or may not be removed.

It is to be understood that the form of my invention herewith shown and described is to be taken as a preferred example of the same and that various changes in the shape, size and arrangement of parts may be resorted to, without departing from the spirit of my invention or the scope of the subjoined claims.

Having thus described my invention I claim:

1. A valve device for use with the tubular seat of a flush tank, said valve device comprising a float casing including a top and a bottom, a tube secured to said bottom and extending below the same and provided at its lower end with an outwardly extending flange, fingers rigidly secured to the lower end of the tube and extending below the same to enter the tubular seat and having inclined outer portions, and an annular hollow valve element which is elastic and resilient and includes a top and bottom and a side, the annular valve element being mounted upon said tube and the top of the valve element engaging the bottom of the float casing and the bottom of the valve element engaging said flange, said valve element being removably mounted upon the tube.

2. The combination with the tubular valve seat of a toilet flush tank, of a valve device for co-action with the tubular valve seat, said valve device comprising a float casing including a top and a bottom, a tube secured to said bottom and extending below the same and provided at its lower end with an outwardly extending flange, fingers rigidly secured to said flange and extending below the same to enter the tubular seat and having outer inclined portions which extend radially beyond said flange, and an annular hollow valve element which is elastic and resilient and includes a top and bottom and a side, the annular valve element being mounted upon said tube and the top of the annular valve element engaging the bottom of the float casing and the bottom of the valve element engaging said flange.

3. A valve device for use with the tubular seat of a toilet flush tank, said valve device comprising a float casing including a top and a side, the side being open at its lower end, a disc mounted within the open end of said side, a tube formed integral with said disc and extending below the same and provided at its lower end with an outwardly extending flange, fingers rigidly secured to the lower end of said tube and extending below the same to enter said tubular seat and having inclined outer portions, and an annular hollow valve element which is elastic and resilient and mounted upon said tube between said disc and flange.

4. A valve device for cooperation with the tubular valve seat of a flush tank, comprising a hollow float body portion formed of substantially hard material and including a bottom, a tube of reduced diameter dependingly secured to the bottom of the float body portion and being formed of substantially hard material, a guide element of substantially hard material dependingly secured to the lower end of said tube and adapted to engage the tubular valve seat for guiding the valve device as the same moves toward the tubular valve seat, and a ring formed of substantially elastic material removably mounted upon said depending tube and surrounding the tube below the float body portion and constituting a valve element for engagement with said tubular valve seat.

5. A valve device comprising a hollow float body portion including a bottom, a tube of lesser diameter than the float body portion dependingly secured to the bottom of the float body portion, a guide element dependingly secured to said tube and adapted to cooperate with the tubular valve seat of a flush tank, and an elastic ring detachably mounted upon said tube and surrounding the tube below the float body portion and having an external diameter substantially greater than the diameter of the tube and forming a valve element for engagement with said tubular valve seat.

References Cited in the file of this patent
UNITED STATES PATENTS

| | | |
|---|---|---|
| 1,511,605 | Gray | Oct. 14, 1924 |
| 2,139,862 | Shesler | Dec. 13, 1938 |
| 2,526,936 | Crandall | Oct. 24, 1950 |
| 2,579,012 | Rekar | Dec. 19, 1951 |